United States Patent [19]

Frankenburg

[11] Patent Number: 4,612,237

[45] Date of Patent: Sep. 16, 1986

[54] HYDRAULICALLY ENTANGLED PTFE/GLASS FILTER FELT

[75] Inventor: Peter E. Frankenburg, Wilmington, Del.

[73] Assignee: E. I. Du Pont de Nemours and Company, Wilmington, Del.

[21] Appl. No.: 808,752

[22] Filed: Dec. 13, 1985

[51] Int. Cl.$^4$ .............................................. B32B 5/02
[52] U.S. Cl. .................................... 428/219; 28/104; 55/DIG. 5; 55/525; 55/528; 428/233; 428/247; 428/251; 428/255; 428/256; 428/280; 428/282; 428/284; 428/285; 428/286; 428/299; 428/421
[58] Field of Search ............... 428/219, 233, 247, 255, 428/256, 280, 282, 284, 285, 286, 251, 299, 421; 28/104; 55/525, 528, DIG. 5

[56] References Cited

U.S. PATENT DOCUMENTS

| | | | |
|---|---|---|---|
| 3,494,821 | 2/1970 | Evans | 161/169 |
| 4,297,404 | 10/1981 | Nguyen | 428/85 |
| 4,324,574 | 4/1982 | Fagan | 428/235 |
| 4,361,619 | 11/1982 | Forsten et al. | 428/234 |

Primary Examiner—James J. Bell

[57] ABSTRACT

A non-woven felt suitable for use as a filter comprised of poly(tetrafluoroethylene) and glass fibers hydraulically entangled to a supporting scrim and a process for making said felt are disclosed. The scrim is made from high temperature and chemically resistant materials.

31 Claims, 1 Drawing Figure

HYDRAULICALLY ENTANGLED PTFE/GLASS FILTER FELT

DESCRIPTION

1. Technical Field

This invention relates to a non-woven felt suitable for use as a filter comprising poly(tetrafluoroethylene) (PTFE) fibers blended with glass fibers and affixed to a scrim by hydraulic entanglement. More particularly, it relates to a product made from short, uniformly distributed fibers hydraulically entangled to scrim fabrics made from high temperature and chemically resistant materials.

2. Background

Felts are non-woven, unbonded fibrous structures deriving coherence and strength from interfiber entanglement and their accompanying frictional forces and represent the oldest form of textile fabric. Felting of man-made textile fibers by utilization of a textile card and needling board is a relatively recent invention. In order to achieve the required cohesion of the final product when using PTFE fibers, long fiber lengths have to be used because of these fibers' low friction characteristics. On the other hand, alternate methods for the uniform dispersal of fibers, such as paper machines, are known to yield extremely uniform, lightweight products comprised of fibrous material, but only from short fibers which are not amenable to attachment to a support scrim by mechanical needling in order to achieve a coherent structure with adequate strength characteristics because of insufficient interlacing.

To produce commercially attractive products for use in filtration, uniformity and adequate mechanical stability are required.

SUMMARY OF THE INVENTION

A felt having a basis weight of 150–600 g/m² suitable for use as a filter comprising a uniformly dispersed sheet-like structure containing 40–95 percent by weight poly(tetrafluoroethylene) fibers having a linear density per filament of 3–8 decitex (dtex) and 5–60 percent by weight glass fibers having a linear density per filament of 0.2–1.5 dtex, hydraulically entangled into a supporting scrim has been discovered. The felt of this invention is a lightweight uniform structure capable of high filtration efficiencies and is resistant to hot corrosive atmospheres. The felt is made by first making a uniformly dispersed sheet-like structure from short fibers and affixing it to a scrim to afford stability and strength without blocking the flow of gases by the supporting scrim. The sheet-like structure should be a web or a waterleaf. The scrim is affixed by hydraulic entanglement and this permits the use of support fabrics such as glass and wire scrims which are generally not amenable to mechanical needling, but contribute useful characteristics such as thermal stability, strength or post-formability. The scrim should be comprised of materials having a low shrinkage of less than 5% up to 200° C. and should be substantially stable to acids and alkali. Examples of possible scrim materials would be: polyimides, poly(tetrafluoroethylene), glass, stainless steel, and polyphenylene sulfide. After hydraulic entangling the sheet-like material to the scrim, the felt can be heatset on a tenter frame depending on the scrim material. For poly(tetrafluoroethylene) the felt could be heatset for at least two minutes at 230°–325° C.

DESCRIPTION OF THE DRAWING

FIG. 1 shows a non-woven poly(tetrafluoroethylene) and glass blend waterleaf (10) hydraulically entangled to a woven glass scrim (12).

TEST METHODS

Taber Abrasion (ASTM-D-1175)

Figure 1:
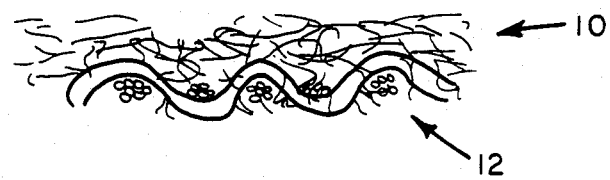
FIG. 1 is a schematic representation of the felt of this invention.

A 12.7×12.7 cm. sample is mounted on a flat surface. Two grinding wheels (size CS-10 medium abrasion and hardness) under a load of 250 g. are rotated on the sample until the surface fibers are worn off and the scrim shows through clearly over ½ of the total abraded surface. The number of cycles to reach the above condition is reported. For purposes of comparison of samples, the number of cycles per sample is divided by the basis weight of the sheet-like structure (web or waterleaf) being abraded.

Air Permeability (ASTM-D-737-75)

The porosity of the felt is determined by the Standard Method of Test for Air Permeability of Textile Fabrics, also known as the Frazier Air Porosity Test.

Air porosity or air permeability is the rate of air flow through a material under a differential pressure between the two fabric surfaces. Air permeability is expressed in cubic feet of air per minute per square foot of fabric at a stated pressure differential between the two surfaces of the fabric. Measurements reported herein are made at a differential water gauge pressure of 0.5 inches (1.27 cm) and converted to m.³/min./m².

Basis Weight

Basis weight is determined by weighing a known area of fabric and is expressed in oz/yd² or g/m².

Thickness

Thickness is measured with a spring-loaded thickness gauge at a pressure of 1.06 kpa.

Filtration Efficiency

To determine efficiency for particle arrestance, the gravimetric method is used. In this test, known amounts of test dust are fed incrementally at a controlled rate using compressed air regulated through a pressure valve and solenoid switch. Efficiency is determined by placing a pre-weighted "absolute" filter (pore size equals 0.8 microns) downstream of the test specimen. The weight gained by the "absolute" filter constitutes the amount of dust passing through the test specimen. The test uses a scaled-down wind tunnel and is carried out as follows:

Filtration efficiency is carried out on 6 in×8 in (15.2×20.3 cm) test samples at 1.2–3.1 m/min. air velocity by adding a standard fly ash dust to the air and collecting and weighting the amount of fly ash passing through the test sample.

The standard fly ash dust consists of a well characterized fly ash collected by Philadelphia Electric Co. from the burning of low sulfur West Virginia coal at Eddystone, PA. The particle size distribution is:

| Size Range (Microns) | Percent by Weight |
|---|---|
| 0–6.2 | 10 |
| 6.3–9.4 | 15 |
| 9.5–17.5 | 25 |

-continued

| Size Range (Microns) | Percent by Weight |
|---|---|
| 17.6–33.5 | 25 |
| 33.6–54.0 | 15 |
| 54.0 | 10 |

The general procedure follows:

1. The samples are installed in the tester and air at a controlled velocity of 0.4 m./min., containing fly ash dust, is passed through the sample for a break-in period of 16–24 hours with 0.8 m./min. air applied in the reverse direction for cleaning. A standard cycle consists of 12 minute filtration, 45 seconds at rest; 1.5 min. reverse air cleaning flow, and 45 seconds rest. The cycle is then repeated. As the testing air flow velocity is increased, the cleaning air velocity is also increased to match velocities. Air temperature is about 32° C.

2. The fly ash dust content of the air is maintained in the range of 4.5–6.9 g./actual cubic meter of air. The amount of fly ash dust leaking through the test sample is collected and weighed at air velocities of 1.18 and 1.82 m./min. in separate six hour experiments. Leakage is expressed as grains/ft$^3$ of actual air or grams/m$^3$ of actual air. Reproducibility of the method was found to be about ±50% of the obtained values. Particulate leakage levels below about 35 mg./m$^3$ are considered acceptable for industrial installations.

Tape Pull Test

The tape pull test is used to determine the tightness with which the staple fibers are attached to the woven glass scrim. A piece of the fabric to be tested is cut to a 12.7×15.2 cm (5×6 in.) and 5 strips of transparent tape, adhesive on one side only (Scotch ® brand 810 "Magic Transparent Tape" made by 3M Co.) 1.9 cm wide and 15.2 cm long (¾×6 in.) are placed on the sample with the adhesive toward the sample. The ends of the tape are turned over so they can easily be pulled up. The sample, with the tapes attached, is then pressed between platens at 1100 kPa (160 psi) and held under pressure for a few seconds. It is then cut into 2.54 cm (1 in.) long strips parallel to the direction of the tape. The tapes are pulled off at a uniform rate and cut into 12.7 cm (5 in.) lengths at 1.9 cm (¾ in.) width and weighed accurately. Several pieces of unused tape are also cut into 12.7 cm (5 in.) lengths and weighed as controls. After subtracting the control weight from the test weight, the amount of fiber pulled off is determined. The amount of fiber picked up under these conditions is compared to the basis weight of the web used in the assembling the product and % fiber pullout calculated.

% Glass × Density Product

The product of % total glass (%G) in the filter felt and the density (D) of the filter felt in g/cm$^3$, $$\%G \times D.$$

is designated as the % Glass×Density Product. It is a measure of the densification of the glass fibers in the filter felt. Because the glass fibers are stiffer and more elastic than PTFE fibers, they do not pack as well as the PTFE fibers. Hydraulically needled fabrics are compressed by the water jets to a dense product, which has higher abrasion resistance than the less dense products made from the same materials by mechanical needling. The % Glass×Density Product for felts of the invention has a value of at least 14, which is a higher value than is obtained with the prior art mechanically needled felts made from the same materials. The % Glass×Density Product determination is only made where the scrim is a glass scrim.

Sample Preparations

Samples are prepared by the following general procedures:

1. Web Preparation

A blend of 7.4 dtex (decitex) (6.7 dpf) poly(tetrafluoroethylene) and 0.33 dtex (0.3 dpf) "E" type glass continuous filament yarns is cut (using a Lummus Cutter, manufactured by Lummus Industries, Inc., Columbus, GA) to the desired length. An antistatic spray (NOPCO LV 40, sold by Diamond Shamrock) is applied as a 5% solution in water. The blend of fibers is then fed into a staple air lay web-forming maching ("Rando-Webber", manufactured by the Rando Machine Corp., The Commons—TR, Macedon, NY) operating at 80% relative humidity. Two passes through the web-forming machine are required to open the fiber blend sufficiently for good processing. After this pre-opening, a third pass is made through the equipment. The operating conditions for the web-processing machine are:

apron speed—2.7 m/min. (3 yds./min.)
feed roll speed—2 to 4.5 rpm for 170 g (6 oz.) fabric
air flow reading—0.057 m$^3$/min. (2.0 ft$^3$/min.)
Lickerin speed—1500–2000 rpm
damper opening—full
air laydown controller—half open The web which is produced is 102 cm (40 in.) wide and is collected on kraft paper. The production rate is about 144 kg/hr. (70 lbs/hr.).

2. Glass scrim

The scrim is a commercially available product (made by Burlington Glass Fabrics and designated as a style 1640 fiberglass scrim). As purchased, it consists of a 40 yarn warp (371 dtex or 334 denier) by 22 yarn fill (578 dtex or 520 denier) woven fabric. The filaments had been coated with 6.4% of a fluorocarbon resin (Burlington designation 615 B) to reduce yarn abrasion. The basis weight of the scrim is 109 g/m$^2$ (3.2 oz/yd.$^2$).

3. Method for Preparing a Waterleaf of PTFE/Glass Fibers

The equipment comprises a laboratory sheet mold consisting of a "head box" to hold the slurry, a filter system to collect the fibers in the slurry, and a vacuum tank to permit rapid filtration of the slurry through the filter system. The filter system consists of a 34 g/m$^2$ (1 oz/yd.$^2$) non-woven polyester fabric (Du Pont Remay ® non-woven polyester fabric) supported on a stainless steel screen having a mesh of about 39 wires per cm (100 wires per in.).

In a typical run, a quantity of twenty liters (about 5.3 gal.) of water containing 10 ml of a non-ionic surfactant (Rohm & Haas Triton X-100 dispersant) is added to the head box to cover the filter system with water. A vacuum of about 50 Torr (about 7 psi) is obtained in the vacuum tank. Separately, 0.6 cm long 7.4 dtex (6.7 dpf) PTFE staple fibers and 0.6 cm long 0.33 dtex (0.3 dpf) glass staple fibers in the desired proportion, totalling about 20 g, are added to 3 liters of water in a laboratory high-speed blender (Waring blender) and stirred at moderate speed to disperse the fibers. To this mix are then added 0.5 g of the same non-ionic surfactant added to the water in the head box, 3 ml of a silicone emulsion antifoam agent (Dow "Antifoam B") and about 1 g of polyvinyl alcohol (PVA) fibers having a length of 1-2 mm. (Duron International VPB-104-2X-4) to act as a temporary binder material. The mix is then stirred for 30 seconds more, transferred to the head box of the sheet mold, and further dispersed by the addition of 25 liters (about 6.6 gal.) of water. The slurry is then redispersed gently with a perforated paddle and allowed to stand about 10 seconds, after which a gate valve was opened to rapidly suck water through the filter system into the vacuum tank.

After vacuum removal of all standing water, the product (a waterleaf of PTFE/glass/PVA fibers) on the non-woven fabric filter is transferred to an oven and dried at 90° C. for 15 minutes. The resultant dried waterleaf is readily removed from the non-woven fabric filter. It is trimmed to form a 30.5 cm×30.5 cm (12 in.×12 in.) waterleaf.

4. Hydraulic Entangling a. Webs of Staple Fiber Blends Attached to Glass Scrims—The web described in section 1. above is carefully transferred from the supporting layer of kraft paper to a glass scrim of the type described in section 2. above. The scrim with the web upon it is then placed on a wire screen having a mesh of about 16 wires per cm (about 40 wires per inch). The scrim with the web upon it is wetted out with a gentle water spray and hydraulically entangled by passing it under a spray device 61 cm (24 in.) long and containing two parallel rows of 0.013 cm (5 mil) holes, 15.7 holes/cm (40 holes/in.) located 2.54 cm (1 in.) above the product to be entangled. The product is initially hydraulically entangled by passing it under jets of water forced from the holes at a water pressure of 13,800 kPa (1500 psi), then removed from the screen having a mesh of about 16 wires/cm, placed on a screen having a mesh of about 39.4×37.8 wires per cm (about 100×96 wires per in.), and hydraulically entangled again under the jets with the water at a pressure of 13,800 kPa (1500 psi), the number of passes at 13,800 kPa being indicated in the examples. The sample is then air dried and characterized.

b. Waterleaves Attached to Glass Scrims—A waterleaf prepared as described in section 3 above is placed on the glass scrim described in section 2 above. The scrim with the waterleaf upon it is hydraulically entangled following the same procedure described in the paragraph above for attaching a web to a glass scrim. The number of passes at 13800 kPa is indicated in the examples.

5. Heat Setting

Products prepared as described in section 3 above are next heat set in an air oven at 300° C. for 15 minutes while being held under fixed length and are then trimmed.

6. Mechanical Needling

Control samples made by mechanical needling are also described herein. In making such control samples, the web described in section 1 above is carefully transferred from the supporting layer of kraft paper to a glass scrim of the type described in section 2 above. The scrim with the web upon it is then needled on a mechanical needling loom (Dilo needle loom) with the number of penetrations per unit area specified in the description of the preparation of the control sample.

In the following examples the percentages given are percentages by weight.

EXAMPLE 1

A random staple fiber web having a basis weight of 168 g/m$^2$ (4.97 oz/yd.$^2$) was prepared as described above under "Web Preparation" from a blend of 85.5% PTFE/14.5% glass staple fibers. The staple fibers had a length of 7.6 cm (3 in.). The web was hydraulically entangled to a glass scrim coated with a fluorocarbon resin, the resin weight being 6.4% of the total scrim weight and the total basis weight of the scrim being 109 g/m$^2$ (3.2 oz/yd.$^2$). The hydraulic entangling was accomplished in two passes at 13,800 kPa (2000 psi). The product was a felt having a basis weight of 283 g/m$^2$ (8.35 oz/yd.$^2$), after heat setting, a density of 0.416 g/cm$^3$, and an air permeability of 8.71 m$^3$/m$^2$/min. at a pressure differential of 1.27 cm (0.5 in.) of water. When tested for filtration efficiency at air velocities of 1.18 and 1.82 m/min., the leakage of fly ash dust was 2.1 and 0.5 mg/m$^3$, respectively. Additional data are provided in Table 1.

EXAMPLE 2

Example 1 was repeated, except that the hydraulic entangling was accomplished in four passes, each at 13,800 kPa (2000) psi. The product was a felt having a basis weight of 257 g/m$^2$ (7.59 oz./yd$^2$) after heat setting, a density of 0.422 g/cm$^3$, and an air permeability of 9.38 m$^3$/m$^2$/min. at a pressure differential of 1.27 cm (0.5 in.) of water. When tested for filtration efficiency at air velocities of 1.18 and 1.82 m/min., the leakage of fly ash dust was 2.0 and 0.9 mg/m$^3$, respectively. Additional data are provided in Table 1.

CONTROL A

Example 1 was repeated, except that the web had a basis weight of 193 g/m$^2$ (5.70 oz/yd.$^2$) and the web was attached to the scrim by mechanical needling instead of hydraulic entangling. The mechanical needling was carried out with a penetration density of 186 penetrations/cm$^2$ (1200 penetrations/in.$^2$). The product "Control A", was a felt having a basis weight of 265 g/m$^2$ (7.81 oz/yd.$^2$) after heat setting, a density of 0.265 g/cm$^3$, and an air permeability of 24.7 m$^3$/m$^2$/min. at a pressure differential of 1.27 cm (0.5 in.) of water. When tested for filtration efficiency at air velocities of 1.18 and 1.82 m/min., the leakage of fly ash dust was 0.3 and 1.0 mg/m$^3$, respectively. Additional data are provided in Table 1.

It will be noted that the felts of Examples 1 and 2 had much better abrasion resistance than the felt designated as "Control A"; also, the % fiber pull-out values were much lower for the felts of Examples 1 and 2 than for "Control A", while the % Glass×Density Product values for the felts of Examples 1 and 2 were mush higher than for "Control A".

EXAMPLE 3

Following the method described above for preparing a waterleaf of PTFE/glass fibers, a waterleaf having a basis weight of 119 g/m$^2$ (3.50 oz./yd$^2$) was made from a mixture of 7.4 dtex, 0.6 cm PTFE (63%), 0.33 dtex, 0.6 cm glass (32%), and PVA (5%) staple fibers. The waterleaf was hydraulically entangled to a glass scrim coated with a fluorocarbon resin, the resin weight being 6.4% of the total scrim weight and the total basis weight of the scrim being 109 g/m$^2$ (3.2 oz./yd$^2$). The hydraulic entangling was accomplished in one pass at 13,800 kPa (2000 psi). The product was a felt having a basis weight of 239 g/m² (7.05 oz./yd²), a density of 0.234 g/cm³, and an air permeability of 14.0 m³/m²/min. at a pressure differential of 1.27 cm (0.5 in.) of water. When tested for filtration efficiency at air velocities of 1.18 and 1.82 m/min., the leakage of fly ash was 3.8 and 6 mg/m³, respectively. Additional data are provided in Table 2.

EXAMPLE 4

Example 3 was repeated, except that the mixture of the staple fibers used to make the waterleaf contained 91.2% of the PTFE staple fibers, 4.9% of the glass staple fibers, and 3.9% of the PVA staple fibers, the basis weight of the waterleaf was 156 g/m² (4.6 oz./yd²), and the hydraulic entangling was accomplished in two passes at 13,800 kPa (2000 psi). The product was a felt having a basis weight of 261 g/m² (7.70 oz./yd²), a density of 0.384 g/cm³, and an air permeability of 17.4 m³/m²/min. at a pressure differential of 1.27 cm (0.5 in.) of water. When tested for filtration efficiency at their velocities of 1.18 and 1.82 m/min., the leakage of fly ash was 3.9 and 7.6 mg/m³, respectively. Additional data are provided in Table 2.

CONTROL B

Example 4 was repeated, except that the waterleaf of PTFE/glass/PVA (91.2/4.9/3.9) staple fibers had a basis weight of 128 g/m² (3.8 oz./yd²) and the waterleaf was attached to the scrim by mechanical needling instead of hydraulic entangling. The mechanical needling was carried out with a penetration density of 186 penetrations/cm² (1200 penetrations/in.²). The product, "Control B," was a felt having a basis weight of 225 g/m² (6.63 oz./yd²), a density of 0.237 g/cm³, and an air permeability of 49.4 m³/m²/min. at a pressure differential of 1.27 cm (0.5 in.) of water. When tested for filtration efficiency at air velocities of 1.18 and 1.82 m/min., the leakage of fly ash was about 18 and about 22 mg/m³, respectively. Additional data are provided in Table 2.

EXAMPLE 5

Example 3 was repeated, except that the mixture of the staple fibers used to make the waterleaf contained 49% of the PTFE staple fibers, 49% of the glass staple fibers, and 2% of the PVA staple fibers, and the basis weight of the waterleaf was 115 g/m² (3.4 oz./yd²). The hydraulic entangling was accomplished by 2 passes at 6900 kPA (1000 psi) and one pass at 10,350 kPA (1500 psi) on the waterleaf side, one pass at 10,350 kPA (1500 psi) on the other side, and a final pass at 13,800 kPa (2000 psi) on the waterleaf side. The product was a felt having a basis weight of 220 g/m² (6.49 oz./yd²), a density of 0.244 g/cm³, and an air permeability of 14.8 m³/m²/min. at a pressure differential of 1.27 cm (0.5 in.) of water. When tested for filtration efficiency at air velocities of 1.18 and 1.82 m/min., the leakage of fly ash was 3.7 and 0.5 mg/m³, respectively. Additional data are provided in Table 3.

EXAMPLE 6

Example 5 was repeated, except that a waterleaf of PTFE/glass/PVA (49/49/2) staple fibers having a basis weight of 83.1 g/m² (2.45 oz./yd²) was hydraulically entangled to each side of a glass scrim having a basis weight of 102.8 g/m³ (3.03 oz/yd²). The hydraulic entangling was accomplished by two passes at 6,900 kPa (1000 psi) and one pass at 10,350 kPa (1500 psi) on the first side, one pass at 10,350 kPa and one at 13,800 kPa (2000 psi) on the other side, and a final pass at 13,800 kPa on the first side. The product was a felt having a basis weight of 262 g/m² (7.74 oz./yd²), a density of 0.262 g/cm³, and an air permeability of 13.11 m³/m²/min. at a pressure differential of 1.27 cm (0.5 in.) of water. When tested for filtration efficiency at air velocities of 1.18 and 1.82 m/min., the leakage of fly ash was 15.7 and 0.2 mg/m³, respectively. Additional data are provided in Table 3.

CONTROL C

Example 5 was repeated, except that the waterleaf of PTFE/glass/PVA (49/49/2) staple fibers had a basis weight of 115 g/m² (3.4 oz./yd²) and the waterleaf was attached to the scrim by mechanical needling instead of hydraulic entangling. The mechanical needling was carried out with a penetration density of 264 penetrations/cm² (1703 penetrations/in²). The product, "Control C," was a felt having a basis weight of 229 g/m² (6.49 oz./yd²), a density of 0.135 g/cm³, and an air permeability of 39.9 /m³m²/min. at a pressure differential of 1.27 cm (0.5 in.) of water. When tested for filtration efficiency at air velocities of 1.18 and 1.82 m/min., the leakage of fly ash was 5.7 and 7.3 mg/m³, respectively. Additional data are provided in Table 3.

EXAMPLE 7

A woven scrim of 444-dtex (400 denier) continuous filament yarn having a basis weight of 115.3 g/m² 3.4 oz./yd²) was prepared. The individual filaments in the yarn had a linear density of 7.4 dtex (6.7 dpf). A quantity of waterleaf similar to the waterleaf of Example 3 was made from a mixture of about 45% 7.4 dtex, 0.6 cm PTFE fibers, about 20% 7.4 dtex, 1.9 cm PTFE fibers, and about 35% 0.33 dtex, 0.6 cm glass fibers, to which mixture was added a small amount of PVA staple fibers. The waterleaf had a basis weight of 135.6 g/m² (4.0 oz./yd²). A sample of the scrim was placed upon a waterleaf of the same area, after which another waterleaf of the same area was placed on top of the scrim. The assembly so formed was placed on a wire screen having a mesh of about 16 wires per cm (about 40 wires per inch), wetted thoroughly, passed over vacuum ports to pull the water out of the assembly, and then passed under hydraulic entangling jets, first at a water pressure of 6900 kPa (1000 psi), then at 10,350 kPa (1500 psi). The assembly was then turned over and passed twice under the hydraulic entangling jets at 13,800 kPa (2000 psi), after which it was turned over again and given a final pass under the jets at 13,800 kPa (2000 psi). The hydraulic entangling apparatus employed, including the jets, was the same apparatus used in Examples 3-6. The product so formed, a felt having a scrim of PTFE fibers with a sheet structure of PTFE/glass (65/35) hydraulically entangled upon each side of the scrim, was air dried and then heat set at 288° C. (550° F.) for about 2 minutes.

The heat-set felt having a basis weight of approximately 450 g/m² and prepared as described above was made up into filtration bags and evaluated in a small pulse-jet unit. In the course of the evaluation, the bags were exposed to typical use conditions, employing 60° C. (140° F.) air at a pressure of 621 kPa (90 psi) and at a pulse frequency of one pulse per 15 seconds. The bags were exposed to this rapid pulsing for 54 days, equivalent to normal use of the bags for 9 years. At the end of the evaluation the bags were removed and inspected for failure. No failures were found at exposures less than the equivalent of 9 years of normal wear.

TABLE 1
Webs of Staple Fiber Blends Attached to Glass Scrim

| Example No. | PTFE/Glass Ratio in Web | Fiber Length in Web, cm | Process Hydraulic or Mechanical | Mullen Burst Strength, kPa | % Fiber Pull-Out | % Glass × Density Product | Taber Abrasion (Cycles per g/m² of basis weight) |
|---|---|---|---|---|---|---|---|
| 1 | 85.5/14.5 | 7.6 | H | 1014 | 1.7 | 18.6 | 28.6 |
| 2 | 85.5/14.5 | 7.6 | H | 1200 | 1.5 | 18.8 | 10.5 |
| Con A | 85.5/14.5 | 7.6 | M | 979 | 31.5 | 13.0 | 2.12 |

TABLE 2
Waterleaf Attached to Glass Scrim

| Example No. | PTFE/Glass Ratio in Web | Fiber Length in Web, cm | Process Hydraulic or Mechanical | Mullen Burst Strength, kPa | % Fiber Pull-Out | % Glass × Density Product | Taber Abrasion (Cycles per g/m² of basis weight) |
|---|---|---|---|---|---|---|---|
| 3 | 63/32 | 0.6 | H | 765 | 10.0 | 14.3 | 2.97 |
| 4 | 91.2/4.6 | 0.6 | H | 650 | 3.3 | 16.1 | 2.21 |
| Con B | 91.2/4.9 | 0.6 | M | 665 | 58.1 | 11.4 | 0.36 |

TABLE 3
Waterleaf Attached to Glass Scrim

| Example No. | PTFE/Glass Ratio in Web | Fiber Length in Web, cm | Process Hydraulic or Mechanical | Mullen Burst Strength, kPa | % Fiber Pull-Out | % Glass × Density Product | Taber Abrasion (Cycles per g/m² of basis weight) |
|---|---|---|---|---|---|---|---|
| 5 | 49/49 | 0.6 | H | 920 | 44.8 | 17.6 | 1.47 |
| 6 | 49/49 | 0.6 | H | 780 | 50.3 | 17.8 | 1.80 |
| Con C | 49/49 | 0.6 | M | 290 | 70.2 | 9.3 | 0.28 |

I claim:

1. A felt having a basis weight of 150–600 g/m² suitable for use as a filter comprising: a uniformly dispersed sheet-like structure containing 40–95 percent by weight poly(tetrafuoroethylene) fibers having a linear density per filament of 3–8 dtex, 5–60 percent by weight glass fibers having a linear density per filament of 0.2–1.5 dtex, hydraulically entangled into supporting scrim.

2. The felt of claim 1 wherein the scrim comprises high temperature resistant and chemically resistant materials having a low shrinkage of less than about 5 percent up to 200° C.

3. The felt of claim 2 wherein the scrim comprises material substantially stable to acids and alkali.

4. The felt of claim 3 wherein the scrim comprises a polyimide material.

5. The felt of claim 3 wherein the scrim comprises poly(tetrafluoroethylene).

6. The felt of claim 3 wherein the scrim comprises glass fibers.

7. The felt of claim 3 wherein the scrim comprises stainless steel.

8. The felt of claim 3 wherein the scrim comprises polyphenylene sulfide.

9. The felt of claim 6 wherein the Percent Glass times Density of the felt is greater than 14.

10. The felt of claim 1 wherein the sheet-like structure is a web and the fiber length in the sheet-like structure is 2–10 cm.

11. The felt of claim 10 wherein the percent by weight glass in the sheet-like structure is less than 40 percent.

12. The felt of claim 11 wherein the percent fiber pull out is less than 10 percent.

13. The felt of claim 11 wherein the Taber Abrasion test is above 10 cycles per g/m² of basis weight.

14. The felt of claim 1 wherein the sheet-like structure is a waterleaf and the fiber length in the sheet-like structure is less than 2 cm.

15. The felt of claim 14 wherein the percent by weight glass in the sheet-like structure is less than 35 percent.

16. The felt of claim 15 wherein the percent fiber pull out is less than 20 percent.

17. The felt of claim 16 wherein the Taber Abrasion test is greater than 2 cycles per g/m² of basis weight.

18. The felt of claim 14 wherein the percent by weight glass in the sheet-like structure is 35–60 percent.

19. The felt of claim 18 wherein the percent fiber pull out is less than 60 percent.

20. The felt of claim 19 wherein the Taber Abrasion test is greater than 1 cycle per g/m² of bais weight.

21. A process for preparing the felt of claim 1 comprising:
   a. blending 5–60 percent by weight glass fibers with 40–95 percent by weight poly(tetrafluoroethylene);
   b. forming a sheet-like structure; and
   c. hydraulically entangling the sheet-like structure with supporting scrim.

22. The process of claim 21 wherein the sheet-like structure is a web.

23. The process of claim 21 wherein the sheet-like structure is a waterleaf.

24. The process of claim 21 wherein the scrim comprises high temperature resistance and chemically resistant materials having a low shrinkage of less than 5 percent up to 200° C.

25. The process of claim 24 wherein the scrim comprises material substantially stable to acids and alkali.

26. The process of claim 25 wherein the scrim comprises poly(tetrafluoroethylene).

27. The process of claim 25 wherein the scrim comprises glass fibers.

28. The process of claim 25 wherein the scrim comprises polyphenylene sulfide.

29. The process of claim 25 wherein the scrim comprises stainless steel.

30. The process of claim 25 wherein the scrim comprises a polyimide material.

31. The process of claim 26 further comprising heat setting on a tenter frame for at least two minutes at 230°–325° C.

* * * * *